United States Patent
Anders et al.

(10) Patent No.: US 9,773,336 B2
(45) Date of Patent: Sep. 26, 2017

(54) CONTROLLING THE STRUCTURE OF ANIMATED DOCUMENTS

(75) Inventors: Mark Anders, San Francisco, CA (US); Joshua Hatwich, San Francisco, CA (US); James W. Doubek, Sunnyvale, CA (US); Joaquin Cruz Blas, Jr., Pacifica, CA (US)

(73) Assignee: Adobe Systems Incorporated, San Jose, CA (US)

( * ) Notice: Subject to any disclaimer, the term of this patent is extended or adjusted under 35 U.S.C. 154(b) by 462 days.

(21) Appl. No.: 13/153,114

(22) Filed: Jun. 3, 2011

(65) Prior Publication Data
US 2013/0132818 A1 May 23, 2013

(51) Int. Cl.
*G06F 17/00* (2006.01)
*G06T 13/00* (2011.01)
*G06F 17/21* (2006.01)

(52) U.S. Cl.
CPC ............ *G06T 13/00* (2013.01); *G06F 17/214* (2013.01)

(58) Field of Classification Search
CPC ............ G06F 3/0481; G06F 17/30864; G06F 17/30905; G06F 17/30873; G06F 17/30997
USPC ........................................................ 715/234
See application file for complete search history.

(56) References Cited

PUBLICATIONS

"Using Dreamweaver", 2000, pp. 407-434.*
Alvarez et al., "Crawling Web Pages with Support for Client-Side Dynamism," 2006.*

* cited by examiner

*Primary Examiner* — Shawn S Joseph
(74) *Attorney, Agent, or Firm* — Wolfe-SBMC

(57) ABSTRACT

Methods and systems for controlling the structure of animated documents are disclosed. In some embodiments, a method includes displaying, via a graphical user interface, a representation of a document, where the document includes a programmatic component configured to create an animation by manipulating a structure of the document, a static structure of the document corresponds to the structure of the document when the animation is not performed, and the animation, upon execution, is rendered starting from an original base state that at least partially defines the static structure. The method also includes, in response to receiving a selection corresponding to a state of the animation, designating the selected state as a new base state, wherein the new base state is different from the original base state. The method further includes altering the static structure of the document to correspond to the new base state.

20 Claims, 12 Drawing Sheets

```
var showBike1_TLD = [ [ { tween: [ "style", "#bike1", "left", "-1000px" ], position: 0, duration: 0 },
{ tween: [ "style", "#bike1", "left", "-345px" ], position: 10, duration: 2490, easing: "easeInOutQuad" },
{ tween: [ "style", "#bike1", "opacity", "1" ], position: 0, duration: 2500, easing: "easeInOutQuad" },
{ tween: [ "style", "#bike2", "left", "1000px" ], position: 0, duration: 1800 },
{ tween: [ "style", "#bike2", "opacity", ".2" ], position: 0, duration: 1800 }
];
```

FIG. 4

```
#bookTitle {
        font-size: 34px;
        text-align: left;
        margin:0;
        line-height: 30px;
        font-weight:bold;
        width:190px;
        color: #ffffff;
        left:20px;
        top:14px;
} bookImage {
        top:100px;
        left:26px;
        width:159px;
        height:189px;
} availableNow {
        color:#ffffff;
        left:56px;
        top:278px;
        font-weight:normal;
        font-size:12px;
} overview {
        position:absolute;
        height:330px;
        width:218px;    1100
        z-index:10;
        background-color:#006633;
        -webkit-border-top-left-radius:6px;
        -webkit-border-bottom-left-radius:6px;
        -webkit-box-shadow: 10px 0px 10px #2a2a2a;
} saladDescription, #coffeeDescription, #platingDescription {
        background-color:rgba(0,0,0,0.6);
        top:250px;
        width:433px;
        height:80px;
        z-index:3;
        color:#ffffff;
} pageHolder {
        position:absolute;
        left:218px;
        width:433px;
```

*FIG. 11*

```
window.symbols = {
   "stage": {
      baseState: "Base State",
      initialState: "default_begin_Default Timeline",
      autoPlay: true,
      parameters: {
      },
      content: {
         markup: "",
         defaultWrapper: ""
      },
      states: {
         "Base State": {
            "#bookTitle": [
               ["style", "left", '20px',undefined]
            ]
         },
         "default_end_Default Timeline": {
            "#bookTitle": [
               ["style", "left", '-75px',undefined]
            ]
         }
      },
      actions: {
      },
      behaviors: [
      ],
      timelineData: {
         "Default Timeline": {
            fromState: "default_begin_Default Timeline",
            toState: "Base State",
            timeline: [
               { tween: [ "style", "#bookTitle", "left", '20px', { valueTemplate: undefined, fromValue: '-75px'}], position: 0, duration: 1000, easing: "linear" }]
            ]
         }
      }
   }
};
/**
 * Adobe Edge DOM Ready Event Handler
 */
```

CONTROLLING THE STRUCTURE OF ANIMATED DOCUMENTS

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND

This specification relates to computer programming, and, more particularly, to systems and methods for controlling the structure of animated documents.

Certain electronic documents may be "animated" by including within it software code that alters the appearance and structure of the document over time. As an example, a single HTML document (e.g., a webpage) may include HTML elements, Cascading Style Sheet (CSS) elements, JavaScript code and/or embedded assets such as images, videos, and/or audio content. The HTML and CSS portions of the document form a document structure that determines how the document is displayed or rendered by a web browser or the like. Meanwhile, the JavaScript code may be executed by the web browser to manipulate the HTML and CSS elements as well as their properties and/or attributes, thus altering the structure of the document and the manner in which the document is rendered. By altering the structure of the document over time, JavaScript effectively animates the document.

SUMMARY

This specification discloses systems and methods for creating and/or editing documents (e.g., HTML documents, etc.) in an animation application (e.g., animation design software, website development program, Internet browser, etc.). In some embodiments, several techniques described herein may be used to control the structure of a document during its animation. For example, certain techniques may allow a webpage designer or user to determine where the natural document structure (or "base state") occurs at any selected point during the animation. As such, the systems and methods described herein may allow editing of the structure of a document independently of the executable code that modifies it, thus giving the designer control over how the document is perceived by search engines. Also, these systems and methods may allow viewers who would otherwise be unable or unwilling to display animations to nonetheless perceive the underlying structure of the document as intended by the designer. By providing control over a document's structure, certain techniques described herein allow a designer to produce documents that utilize animation while continuing to function well in various different web environments.

For example, in some embodiments, a method may include receiving a request to create a document, where the document includes a programmatic component configured to render an animation by manipulating a structure of the document. The method may also include enabling selection of one of a plurality of possible base states to at least partially define the static structure of the document.

In other embodiments, a computer-readable storage medium may have program instructions stored thereon that, upon execution by a computer system, cause the computer system to identify a document, where the document includes a programmatic component configured to create an animation by manipulating a structure of the document, where a static structure of the document corresponds to the structure of the document when the animation is not performed, and where the animation, upon execution, is rendered starting from a given state that at least partially defines the static structure. The program instructions, upon execution, may also cause the computer system to receive a selection of a new state of the animation, where the new state is different from the given state, and modify the programmatic component of the document to cause the same animation to be rendered, upon execution, beginning at the new state.

In yet other embodiments, a system may include at least one processor and a memory coupled to the at least one processor, where the memory stores program instructions, and where the program instructions are executable by the at least one processor to display, via a graphical user interface, a representation of a document, where the document includes a programmatic component configured to create an animation by manipulating a structure of the document, where a static structure of the document corresponds to the structure of the document when the animation is not performed, and where the animation, upon execution, is rendered starting from an original base state that at least partially defines the static structure. The program instructions may also be executable by the at least one processor to, in response to receiving a selection corresponding to a state of the animation, designate the selected state as a new base state, where the new base state is different from the original base state. The program instructions may further be executable by the at least one processor to alter the static structure of the document to correspond to the new base state.

BRIEF DESCRIPTION OF THE DRAWINGS

FIG. 4 is an example of a timeline data structure according to some embodiments.

FIGS. 11 and 12 show software code part of an animation example according to some embodiments.

Figure 1:
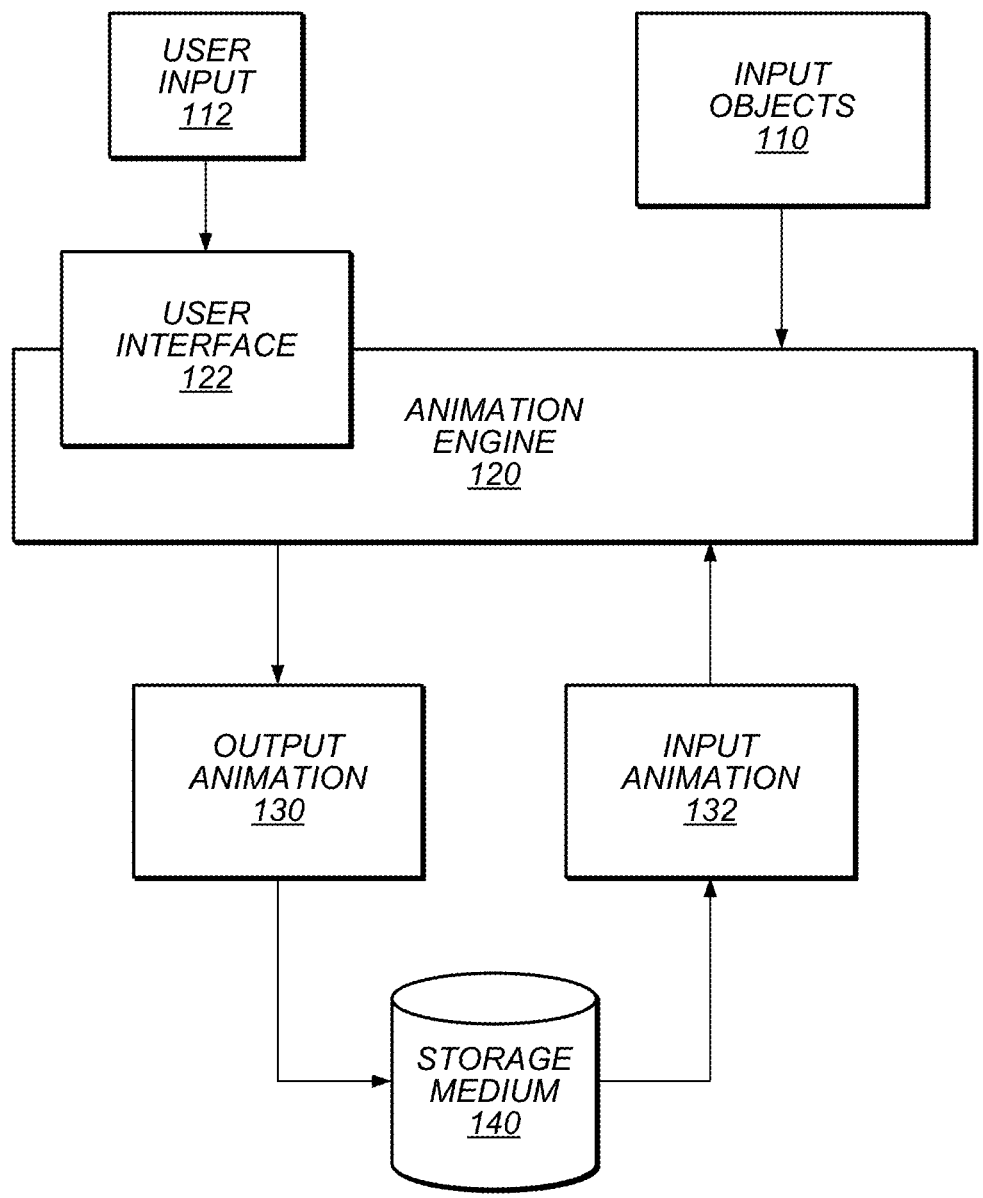
FIG. 1 is a block diagram of an animation software program configured to implement various systems and methods disclosed herein according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

Introduction

This detailed description first discusses an illustrative animation software program, followed by an example of a graphical user interface for such a program as well as various techniques for creating and processing animation timelines. The specification further discloses techniques for controlling the structure of animated documents such as, for example, HTML documents or the like. Lastly, the description discusses a computing system configured to implement certain embodiments disclosed herein. The term "animation," as used throughout this specification, may include an animation, graphical presentation, multimedia content, advertisement, motion picture, film, movie, cartoon, or the like.

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

An Animation Software Program

FIG. 1 shows a block diagram of an example of an animation software program configured to implement one or more of the various systems and methods disclosed herein. In some embodiments, the animation software may be part of an animation design environment and may be executed on a computing device such as described in FIG. 13, for example. As illustrated, user input 112 may be provided to animation engine 120 via user interface 122 and it may allow a user (e.g., an animation designer or a viewer) to interact with the animation software. As such, user input 112 may include any kind of input received through any suitable device, such as, for example, a mouse, track pad, touch screen, keyboard, microphone, camera, or the like. In alternative embodiments, user input 112 may be at least in part replaced with a script or program to automate at least some of the techniques described herein.

To design a new animation, animation engine or module 120 may receive user input 112 requesting that a new animation file or project be created. Thereafter, the user may request, for example, that one or more input objects 110 (e.g., an image, sound and/or video clip) be added to the animation. Examples of image files and formats include JPEG, JFIF, TIFF, RAW, PNG, GIF, BMP, CGM, SVG, PNS, and JPS, among others. The user may then continue to interact with animation engine 120, for example, by changing a property (e.g., a position, color, font, background, opacity, etc.) of the newly added image over time, which may be graphically represented in a "timeline." Once the animation is complete, the animation engine may create output animation 130 and store it in storage medium 140. As described in more detail below, storage medium 140 may include a system memory, a disk drive, DVD, CD, etc. Additionally or alternatively, animation engine 120 may retrieve input animation 132 from storage medium 140 to allow the user to further develop an existing animation or file.

In some embodiments, animation engine 120 may include a number of routines, algorithms, functions, and/or libraries that expose an application programming interface (API) that allows a user to create an animation, presentation, multimedia file, or the like. For example, in a case where output animation 130 is encoded in a HyperText Markup Language (HTML) file for display on a web browser or the like (e.g., Internet Explorer®, Firefox®, Safari®, Chrome®, etc.), animation engine 120 may include implementations of scripting languages (e.g., JavaScript) and associated libraries (e.g., jQuery) that allow the user to encode an animation within an HTML file using a particular API. More generally, animation engine 120 may include software code that allows the user to implement any number of technologies such as, for example, HTML, Java, JavaScript, Cascading Style Sheets (CSS), Scalable Vector Graphics (SVG), Canvas (a procedural model that updates bit maps in HTML), etc. that may be suitable for animating content. In some embodiments, the functions disclosed in the sections presented below may be performed by animation engine 120 implemented by program instructions stored in a computer-readable storage medium and executable by one or more processors (e.g., one or more CPUs or GPUs).

Animation engine 120 may further include a layout engine (not shown) to enable the rendering of web pages or the like. For example, in certain embodiments, animation engine 120 may include a WebKit module that is configured to display of web content in windows, executes JavaScript, and also to implement other browser features (e.g., clickable links, etc.). In other embodiments, however, any other suitable rendering engine may be implemented as part of animation engine 120.

A User Interface

Figure 2:
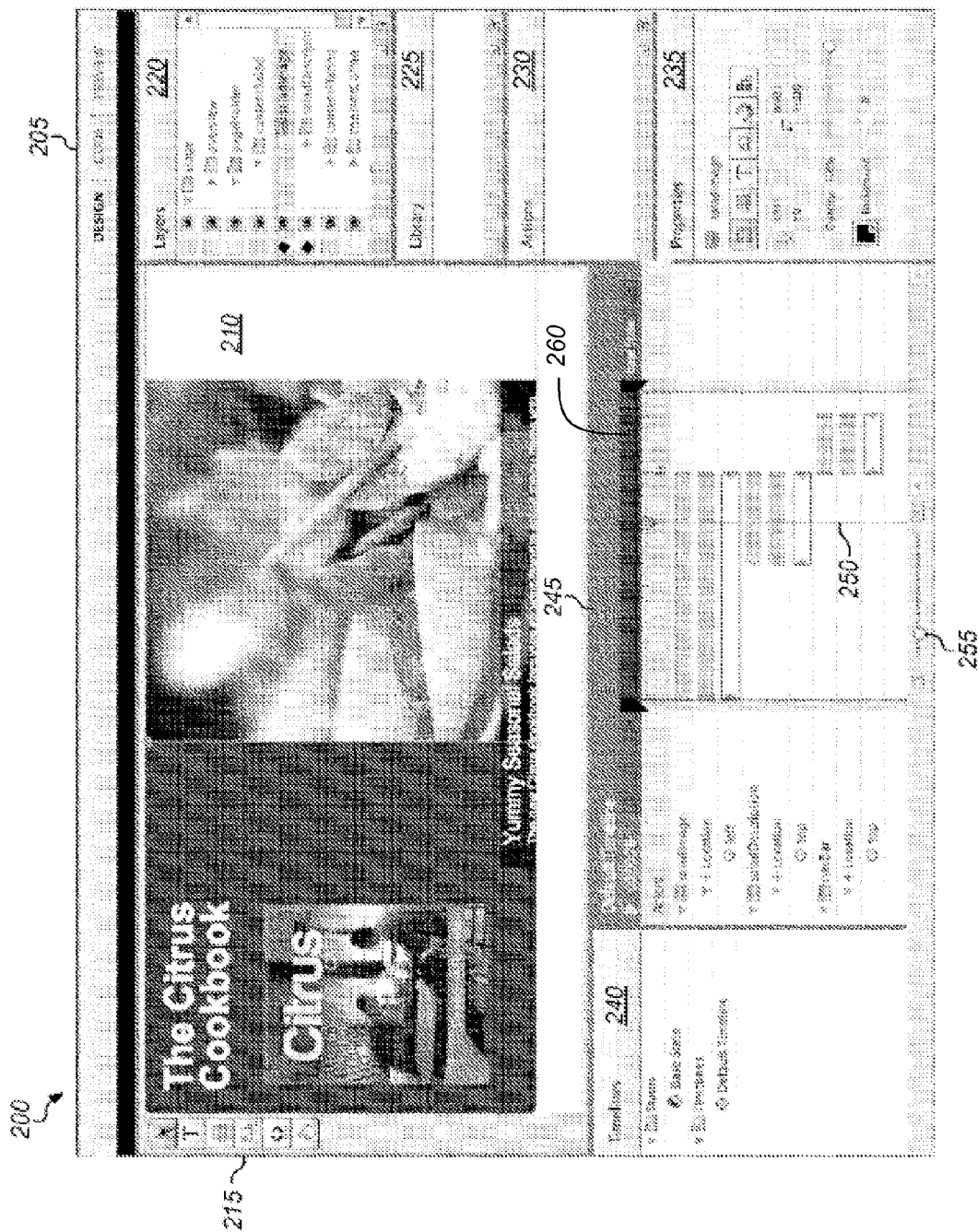
FIG. 2 is a screenshot of a user interface of a software program configured to implement systems and methods disclosed herein according to some embodiments.

Turning to FIG. 2, an illustrative user interface (UI) 200 of an example software program configured to implement various systems and methods disclosed herein is depicted. In some embodiments, UI 200 may be implemented as user interface 122 of animation engine 120 described in FIG. 1. As shown, UI 200 includes menu 205 that allows selection of a design view, code view, or preview view. The selected view ("design," in this case) may be bolded to indicate the current state of UI 200. When in design view, UI 200 may display a variety of menus, windows or panels (e.g., 210-245), and/or toolboxes (e.g., 215) that allow a user to create or develop an animation, presentation, advertisement, motion picture, or the like. The code view may display resulting software code (e.g., HTML) that may be rendered or executed to reproduce the animation, whereas the preview view may present the animation as it would appear in a selected Internet browser, media player, or the like.

As illustrated, UI 200 includes stage 210 where an animation is graphically developed by the user. For example, the user may open or import one or more images, objects, or "actors" (e.g., input objects 110 of FIG. 1) and place them on stage 210. Toolbar or toolbox 215 may allow the user to make certain modifications to those actors. Additionally or alternatively, toolbox 215 may allow a user to create certain types of actors (e.g., text, lines, geometric figures, etc.) and add them directly to stage 210. UI 200 also includes layer window or panel 220 configured to show Document Object Model (DOM) elements of the underlying HTML code, as well as library window or panel 225, which is configured to dynamically display object or animation libraries that may be available to the user during operation. For example, in some embodiments, an animation library may allow a user to introduce an existing function to an animation. Similarly, UI 200 may include actions window or panel 230, which may be configured to dynamically display actions that allow the user to create event-based animation (e.g., in response to a user "clicking" on a particular actor, etc.).

UI 200 further includes properties window or panel 235 configured to show certain properties that are associated with a selected actor or object ("saladimage," in this example). In some cases, properties panel 235 may expose object properties that may be modified by a user. For example, if the object is a graphical element, applicable properties may include, but are not limited to, a position, size, color, background, font type, opacity, 2-dimensional transformation (e.g., rotation, translation, etc.), and 3-dimensional transformations, among others. In the case of an audio element, for instance, properties may include, but are not limited to, level, pitch, playback speed, and sound effects (e.g., delay, reverb, distortion, etc.), among others. In some cases, by selecting a particular actor (e.g., on state 210) and modifying a given property in panel 235 that is associated with that actor, UI 200 may allow the user to "animate" that actor.

UI 200 includes timeline panel 240, which enables the user to select an existing timeline or to create a new timeline upon which the animation may be developed. In some embodiments, a designer may develop two or more timelines simultaneously and/or one timeline nested within another. Upon selection or creation of a particular timeline in panel 240, the selected timeline appears in panel 245. In this example, a "default timeline" is shown in panel 245. As illustrated, timeline panel 245 is configured to animate three actors—i.e., "saladimage," "saladDescription," and "navbar." In some embodiments, timeline panel 245 enables a user to add, remove, or select one or more of the available actors to the selected timeline by "dragging-and-dropping" the actor in and out of timeline panel 245. As shown in FIG. 2, location properties of each actor ("left," "top," and "top," respectively) are configured to change over time, although in general any property of any actor may be added or removed from the current or default timeline.

In some embodiments, timeline panel 245 may include a "playhead" or "timeline cursor" 250 that indicates the point in time of the animation that is currently playing, or the point where playback will start when the user initiates or plays the animation. In some embodiments, a user may click and drag playhead 250 along the timeline to move to a different portion of the animation. Furthermore, panel 210 may be synchronized with panel 245 such that, while the user moves playhead 250 around, panel 210 approximately simultaneously displays a corresponding portion of the animation.

In some embodiments, panel 245 may include a bar (e.g., bar 260) or some other graphical representation that indicates the start time, end time, and/or duration of the animation of each property of each actor being modified over time. For example, panel 245 shows that the "left" property of the "saladimage" actor begins to be modified at t=0 seconds, and that the "top" property of the "saladDescription" actor begins to be modified sometime after that. The modifications to both properties of both actors ends simultaneously at t=1 seconds. In other words, the different animations of "saladimage" and "saladDescription" occur at least partially in parallel. On the other hand, the modification to the "top" property of the "navbar" actor begins at t=1 seconds and continues on its own afterwards.

In some embodiments, UI 200 may be configured to allow a user to select a portion of a selected bar (e.g., the center, left and/or right edge of bar 260) and move it along the timeline to change the start time, end time, and/or duration of the animation. In addition, panel 245 may also include zoom tool 255 that allows the user to modify the scale of the timeline during the design of the animation.

The timelines depicted in panels 240 and 245 of FIG. 2 may serve as a mechanism around which an animation or presentation is synchronized or choreographed. In some embodiments, different portions of an animation may utilize different timelines that are synchronized with a master timeline or the like. For example a first animation of a first element may be synchronized around a first timeline (e.g., to roll content onto a stage) and a second animation of a second element may be synchronized with a second timeline (e.g., to roll the content off the stage) to create a "content rotator" or the like. Both the first and second timelines may be synchronized with a master timeline. Additionally or alternatively, two or more timelines may be nested within each other so that, for example, an event in one timeline may trigger execution of another timeline. In some cases, elements may be placed on the timeline and then converted to "symbols" in order to be manipulated. In other cases, elements may be retrieved dynamically during execution of an animation (e.g., from external storage or from a web server).

Although UI 200 is depicted as a timeline-based interface, in other embodiments other sequencing mechanisms may be used. For example, a storyboard may illustrate series of images displayed in sequence for the purpose of visualizing an animation. Similarly, a flowchart and/or an event list may also be used. For sake of illustration, however, a timeline data structure is discussed below.

Animation Timelines

Figure 3:
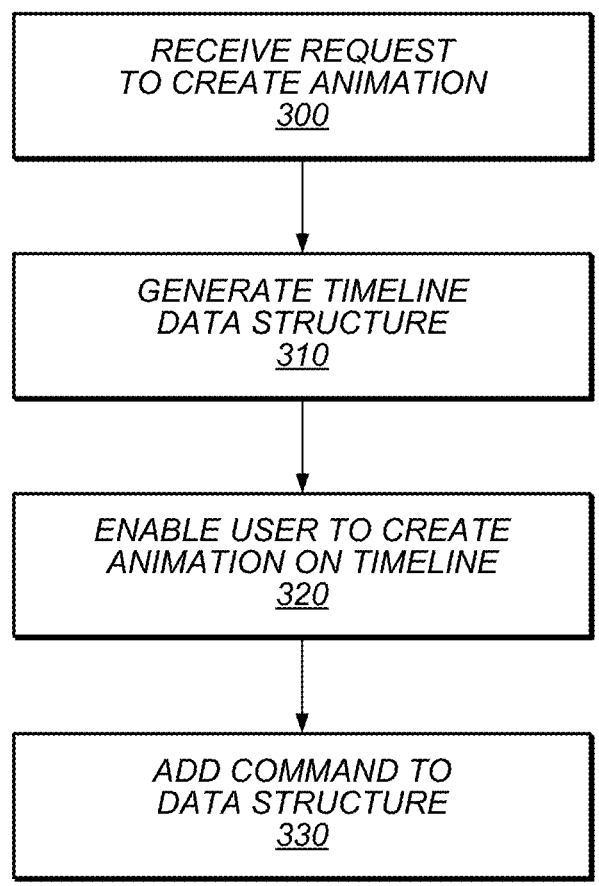
FIG. 3 is a flowchart of a method for creating a timeline data structure according to some embodiments.

In some embodiments, timeline panel 245 depicted in FIG. 2 may expose a graphical representation of an animation timeline. Turning now to FIG. 3, a flowchart of a method for creating and executing an animation timeline is depicted according to some embodiments. At 300, the method receives a request to create an animation (e.g., via user input 112 shown in FIG. 1). At 310, the method generates a timeline. In some embodiments, the timeline may be created in the design view of UI 200. Additionally or alternatively, the timeline may be created using an HTML editor, text editor, or the like. At 320, a user may animate a particular element or image along the graphical representation of the timeline. For example, the user may select that a given property of the element (e.g., position, color, opacity, etc.) change in a certain manner over time. In response to the animation, the method may add a corresponding declarative command or object to the timeline at 330.

FIG. 4 is an example of a timeline data structure (TLD) according to some embodiments. As illustrated, a timeline "showBike1_TLD" variable has been created in JavaScript in the form of an array of declarative commands or objects. In this example, all commands are "tween" commands configured to automatically add or modify a series of frames between two existing frames, although any other command or object may be enabled in other typical implementations. This particular animation includes five (5) distinct commands, and each command has a number of attributes. Specifically, the first attribute of first command specifies that a CSS transformation is being called (i.e., "style"), and the second attribute indicates that the animation is being applied to the "bike1" element or image. The third attribute reveals that the "left" property of "bike1" is being modified, and the fourth attribute sets the end value of that property at −1000 pixels. The fifth attribute indicates the position along the timeline when the command begins to be executed (in this case, t=0), and the sixth attribute indicates the duration of the execution of the command (t=0).

The second command shown in FIG. 4 operates upon the same property ("left") of the same element ("bike1"), but the command begins execution at t=10 milliseconds and continues for 2.49 seconds. A seventh attribute sets an easing function that determines the type of interpolation between frames of the animation caused by execution of the command (e.g., "easeInOutQuad"). The third command operates on a different property ("opacity") of the same element ("bike1"), begins execution at the same time as the first command, and continues to be executed at least partially in parallel with the second command. The fourth and fifth commands perform similar functions, but on a second element ("bike 2").

The timeline data structure of FIG. 4, when executed, initially places the actor with the id of "bike1" off stage and out of view at −1000 pixels, while it places "bike 2" on the stage. It then proceeds to incrementally move bike1 to the right, frame by frame, until it appears on stage (−345 pixels); all the while, changing its opacity until it finally becomes fully visible (i.e., opacity=1). At partially in parallel with these operations, the timeline is also animating an actor called "bike2" that moves off stage to the right, while fading to the point where it can be barely visible (i.e., opacity=0.2). (For purposes of illustration, screenshots of this example animation are discussed with respect to FIG. 13 below.)

In certain embodiments, a timeline data structure may include a collection of elements, and each element may be a command or object that operates upon an actor to animate that actor (or otherwise modify a value of a property of that actor) over time. In some cases, timeline elements may themselves contain other timelines, thus resulting in a data structure that is tree-like. When implemented in animation engine such as engine 120 of FIG. 1, for instance, a timeline data structure may include any type of command or object supported by the various technologies implemented in that engine (e.g., HTML, Java, JavaScript, CSS, SVG, Canvas, etc.).

Figure 5:
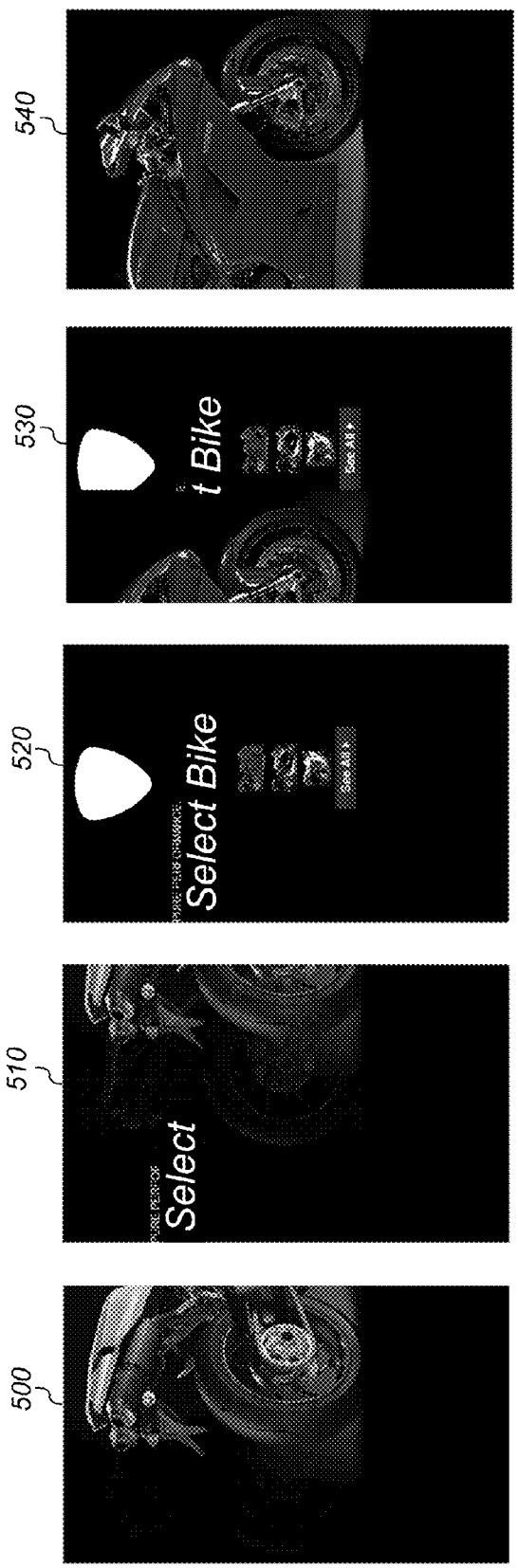
FIG. 5 shows screenshots of an animation generated according to some embodiments.

Turning now to FIG. 5 screenshots of an animation generated using techniques described herein are depicted according to some embodiments. As illustrated, 500 and 510 show "bike2" leave the stage upon execution of "tween" commands that create the animation. Thereafter, element 520 appears in the form of a menu, which allows a user to select one of three bikes (e.g., "bike 1," "bike 2," or "bike 3"). Upon selection of an event by the user, the selected bike enters the stage at 530 and 540.

Controlling the Structure of an Animated Document

In some embodiments, a document created or edited using animation engine 120 via UI 200 may result in an HTML document having structural elements (e.g., HTML, CSS, etc.), programmatic elements (e.g., JavaScript, etc.), and/or other components. Generally speaking, structural elements such as HTML and CSS may define the document's appearance to a viewer. On the other hand, programmatic elements or components such as JavaScript may be executed to manipulate the structure of the document by modifying the properties and/or attributes of the HTML and CSS elements, and thereby create an animation. When the animation is not being rendered or performed, the structure of the document may be said to be "static." During the animation, however, the structure (e.g., the properties or attributes of the various HTML or CSS elements) may be dynamically altered.

Web browsers are typically capable of parsing the HTML and CSS elements to analyze static, structural elements, and to determine how to display them to the user. Search engines, web crawlers, and/or document indexing tools also work in a similar way, analyzing the static structural elements of a document to understand the information that the document contains. In order to determine how a programmatic element or component within a document affects its structure, the programmatic element would normally have to be turned into an executable format and run.

However, search engines and the like are generally incapable executing programmatic components or elements during indexing operations. As a result, any modifications caused by an animation of structural elements within the document are generally not taken into account. In addition, certain web browsers may not be capable of executing the relevant type of code, and therefore may be unable to display the animation portion of the document. Even when browsers are in fact capable of displaying such animations, there are many cases when such a functionality may be turned off (e.g., to preserve battery life on a mobile device, or the like).

To the illustrate foregoing, consider a scenario where a designer creates an HTML document in its initial or "natural state," and then adds animation effects or the like to the various structural elements of the document using JavaScript to result in the animation shown in FIG. 5. As illustrated, the natural state of the underlying document may be rendered as screenshot 500. The added JavaScript code may be configured to cause the animation to progress from the initial, natural state of screenshot 500 all the way to a final state corresponding to screenshot 540. In this particular case, for example, if the JavaScript code were not executed, the underlying document in its natural state would not be rendered with the text shown in screenshot 520 (or anything beyond what is shown in screenshot 500). In some cases, for example, the text may actually be in the document, but may be invisible during rendering through manipulation of its opacity.

Thus, in a browser without animation rendering capabilities, the document would be displayed in its natural state and without the text of screenshot 520. Furthermore, a search engine would ordinarily not be capable of executing the animation and therefore would not take the text of screenshot 520 into account during indexing. In some cases, a document may contain a reference to certain elements (e.g., text, image, sound, etc.) that are dynamically obtained from an external source (e.g., a server) and introduced into an animation at run-time—that is, the elements themselves are not a part of the document. In these cases, not having those elements considered during the indexing operation may cause the search engine to improperly classify the document. In other cases, the animation may alter the position, text, color, size, etc. of elements existing within a document in a way that would, if considered by the search engine, also alter the results of the document's indexing operation (e.g., the animation may cause certain words to be added to the rendering of the document, moved to the top or bottom of the page, change font size, etc.).

In short, the "natural structure" or "base state" of a document, that is, the static structure that its rendered representation may have without running the programmatic or animation code it contains, is important for a number of reasons. As noted above, search engines analyze the natural, static structure of a document to build up an understanding of the data that the page contains. This allows the document to be searchable and for context dependent advertisements to be applied. Additionally, sometimes a viewer may render HTML documents using only the static structure of the document; that is, without executing the animation code (e.g., for security concerns or because the browser or device does not support execution of JavaScript).

In some embodiments, system and methods disclosed herein may allow a user, designer, or animator to determine the point in time at which the natural document structure occurs during the animation. For example, an animation engine such as engine 120 may allow a user to create and edit animations using a timeline such as the one shown in frame 245 of UI 200 in FIG. 2. Additionally or alternatively, another mechanism such as a storyboard, flowchart, or an event list may be provided. In these types of environments, animation engine 120 may allow the user to determine which point of the animation should be used as the document's base state.

For instance, a user may create an animated document that has its natural state corresponding to the beginning (e.g., first frame) of an animation. Then, the user may be able to select another portion or state of the animation (e.g., the end/last frame of the animation, or any point in between the beginning and the end of the animation) and designate that portion or state as the document's base state. The user may also be able to move the base state along a timeline (or story board, etc.) to select alternative ones among a plurality of base states. In some embodiments, each time the user selects a new base state for the document, the programmatic elements of that document that cause the animation to be rendered may be altered such that the same animation may still be displayed in the same manner despite the document's new base state. For example, if a later selected base state occurs after the document's previous base state, a parameter within a JavaScript or command may be recalculated so that, upon loading of the document by a web browser, the animation causes the rendering corresponding the document's selected base state to revert to a previous value. As such, the same animation may be rendered regardless of the user's selection of a given base state.

In addition to providing the user with control as to selecting a document's base state, animation engine 120 may also provide the user with an indication of when an editing operation is expected to cause a modification of the animation as opposed to the underlying document. For instance, when a user edits the animation, animation engine 120 may detect which portion of the animation is being altered. If the editing would cause a modification of the current base state of the underlying document, an indication may be provided that the document itself is being modified. On the other hand, if the editing would cause modification of another portion of the base state that would not otherwise affect the structure of the document, another indication may be provided that the animation, and not the document, is being modified. In various embodiments, these different indications may be implemented as visual cues (e.g., causing playhead 250 to blink, change colors, etc.), audio cues (e.g., beeping sounds), or the like.

Figure 6:
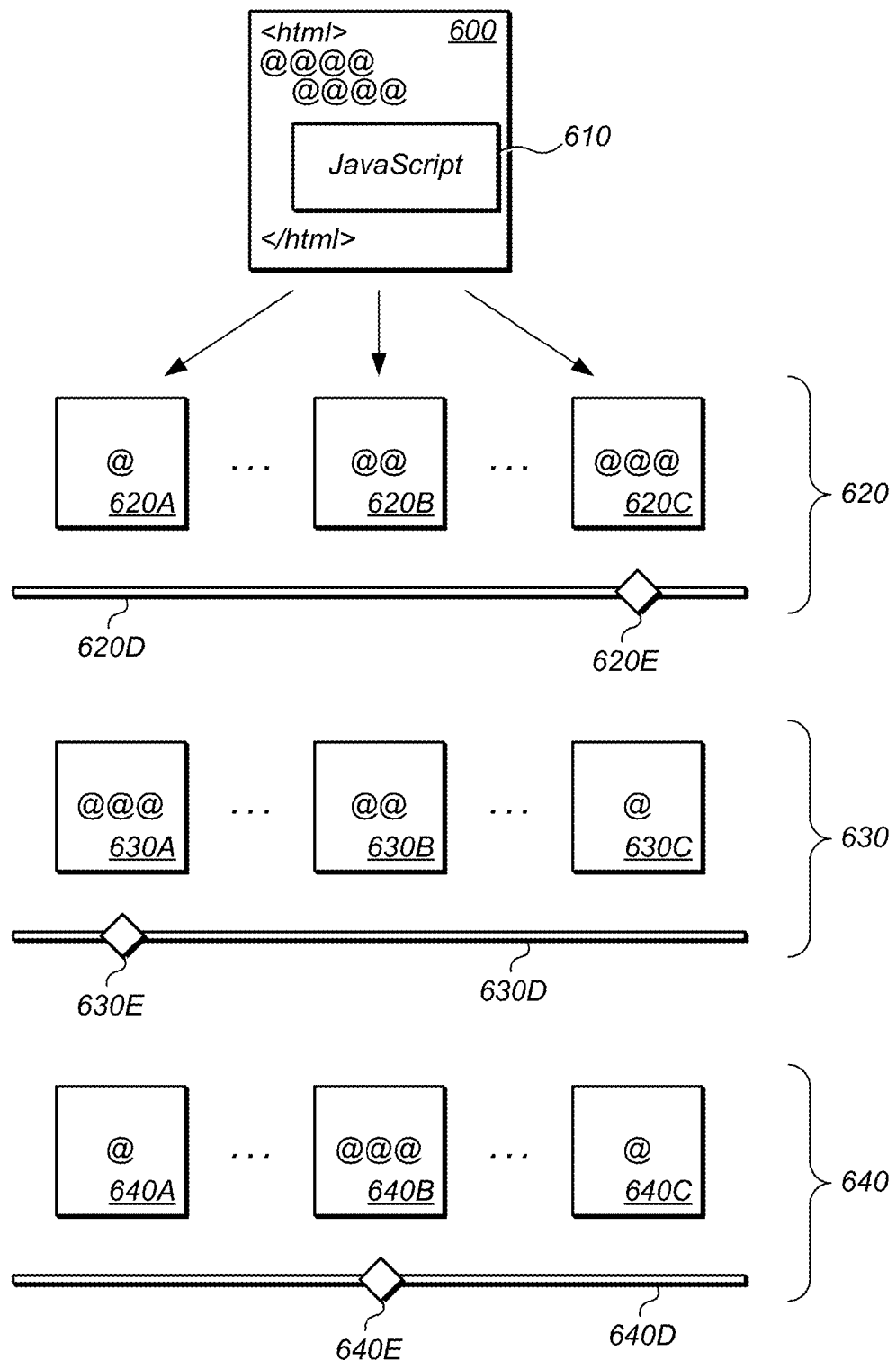
FIG. 6 shows diagrams of various base state selections according to some embodiments.

Turning now to FIG. 6, diagrams of various base state selections are depicted according to some embodiments. As shown, document 600 may include a number of structural elements (e.g., HTML, CSS, etc) as well as programmatic element 610 (e.g., JavaScript, etc.) that, when executed by a web browser, cause the web browser to render one of animations 620-640. For sake of illustration, assume a scenario where execution of JavaScript 610 results in animation 620 that produces a "fade in" effect. Specifically, along timeline 620D, the rendered version of document 600 is presented with a first amount of information "@" at 620A, which increases to "@@" at 620B and ends with "@@@" at 620C. (It should be noted that the symbol "@" is being used to indicate any type of information, which may include text, images, audio, or the like). An example of a "fade in" effect may include a web page that initially appears with a solid background color (e.g., black), and during the course of the animation, introduces additional information (e.g., text, images, etc.) over that background.

In some embodiments, a user may select a portion of the animation closer to its ending, for example, by using playhead or cursor 620E to request that rendering 620C become the base state of document 600. The request may be accomplished, for example, by "right-clicking" a pointing device upon a portion of timeline 620D corresponding to rendering 620C and selecting a "designate as base state" option from a drop-down menu. Additionally or alternatively, selection of a base state may be performed via touch-screen, voice commands, or the like. Irrespective of which point along timeline 620D may be selected to correspond to the base state of document 600, animation 620 may be rendered in substantially the same way by recalculating one or more parameters within JavaScript code 610. Furthermore, in response to selection of a base state corresponding to rendering 620C, animation engine 120 may from that point forward identify the selected portion of the timeline as the document's base state. As such, if a user edits or otherwise alters document 600 in a manner that would affect the current base state, animation engine 120 may provide a visual cue (e.g., by causing playhead 620E to blink or change colors) to indicate to the user that the document structure (i.e., HTML and/or CSS) elements are being modified. In the absence of such cues (or in the presence of different such cues) the user may infer that its modifications are affecting the animation (e.g., JavaScript code 610), and not the underlying structural document elements.

As another example, assume another scenario where execution of JavaScript 610 results in animation 630 that produces a "fade out" effect—i.e., the reverse of animation 620. Specifically, along timeline 630D, the rendered version of document 600 is presented with a first amount of information "@@@" at 630A, which decreases to "@@" at 630B and ends with "@" at 630C. An example of a "fade out" effect may include a web page that initially appears with a given amount of information (e.g., text, images, etc.) that disappears over time. In this case, the user may select a portion of the animation corresponding to playhead 630E and rendering 630A as the new base state of document 600.

As yet another example, animation 640 may include a mixture of "fade in" and "fade out" effects, such it may be desirable for the user to select the portion of the animation corresponding to playhead 640E and rendering 640B as the new base state of document 600. For ease of explanation, the examples illustrated in FIG. 6 assume that a user would be generally more interested in selecting base states corresponding to renderings that display the most amount of information on the rendered version of document 600. However, that may not always be the case, and it should be understood that the techniques disclosed herein provide a user with complete control over the selection of base states, which may in fact be designated at the user's discretion at any point in the animation.

Figure 7:
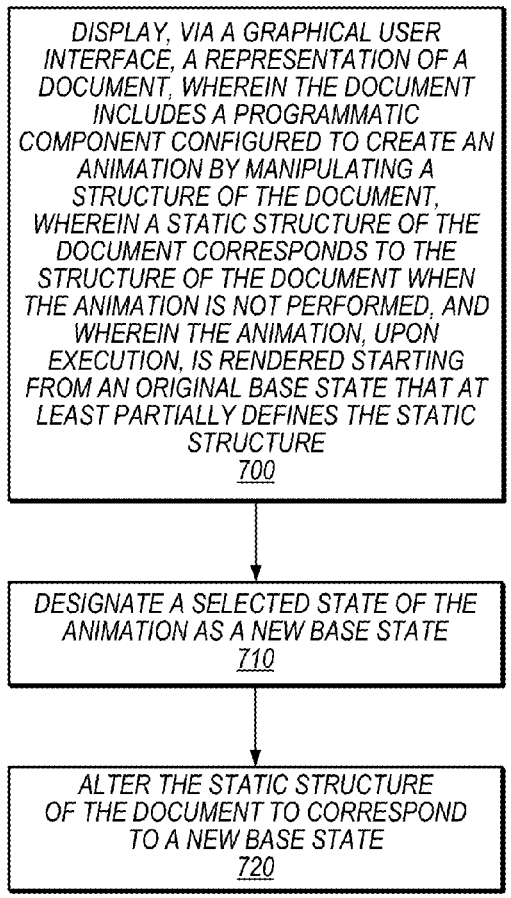
FIGS. 7 and 8 are flowcharts of methods for controlling the structure of animated documents according to some embodiments.

Turning now to FIG. 7, a flowchart of a method for controlling the structure of animated documents is depicted according to some embodiments. At block 700, the method may display, via a graphical user interface, a representation of a document (e.g., document 600). The document includes one or more programmatic components (e.g., JavaScript 610) configured to create an animation (e.g., 620) by manipulating a structure of the document, where a static structure of the document corresponds to the structure of the document when the animation is not performed, and where the animation, upon execution, is rendered starting from an original base state (e.g., 620A) that at least partially defines the static structure. At block 710, the method may receive a selection corresponding to a state of the animation (e.g., 620C or 620E), and may designate the selection as a new base state, such that the new base state is different from the original base state. And at block 720, the method may then alter the static structure of the document to correspond to the new base state.

Figure 8:
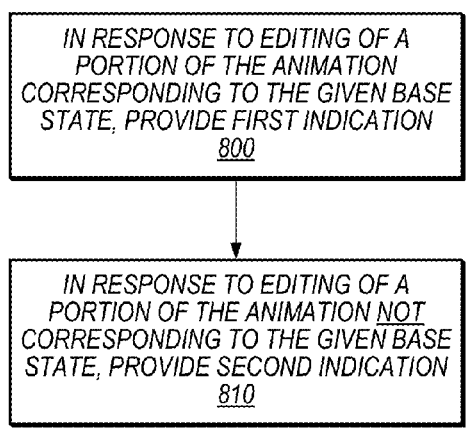

Turning now to FIG. 8, a flowchart of another method for controlling the structure of animated documents is depicted according to some embodiments. At block 800, the method may provide an indication (e.g., visual or audio cue) in response to editing of a portion of the animation (e.g., 620) that corresponds to the given base state (e.g., 620A). In some embodiments, the absence of such cues may indicate to the user that the base state of the document is not being altered.

Alternatively, at block 810, in response to editing of a portion of the animation that does not correspond to the given base state, the method may provide a second, different indication that instructs the user that the document's programmatic components (e.g., JavaScript 610), and not its static structural elements (e.g., HTML, CSS, etc.), are being affected by the user's editing operations.

Figure 9:
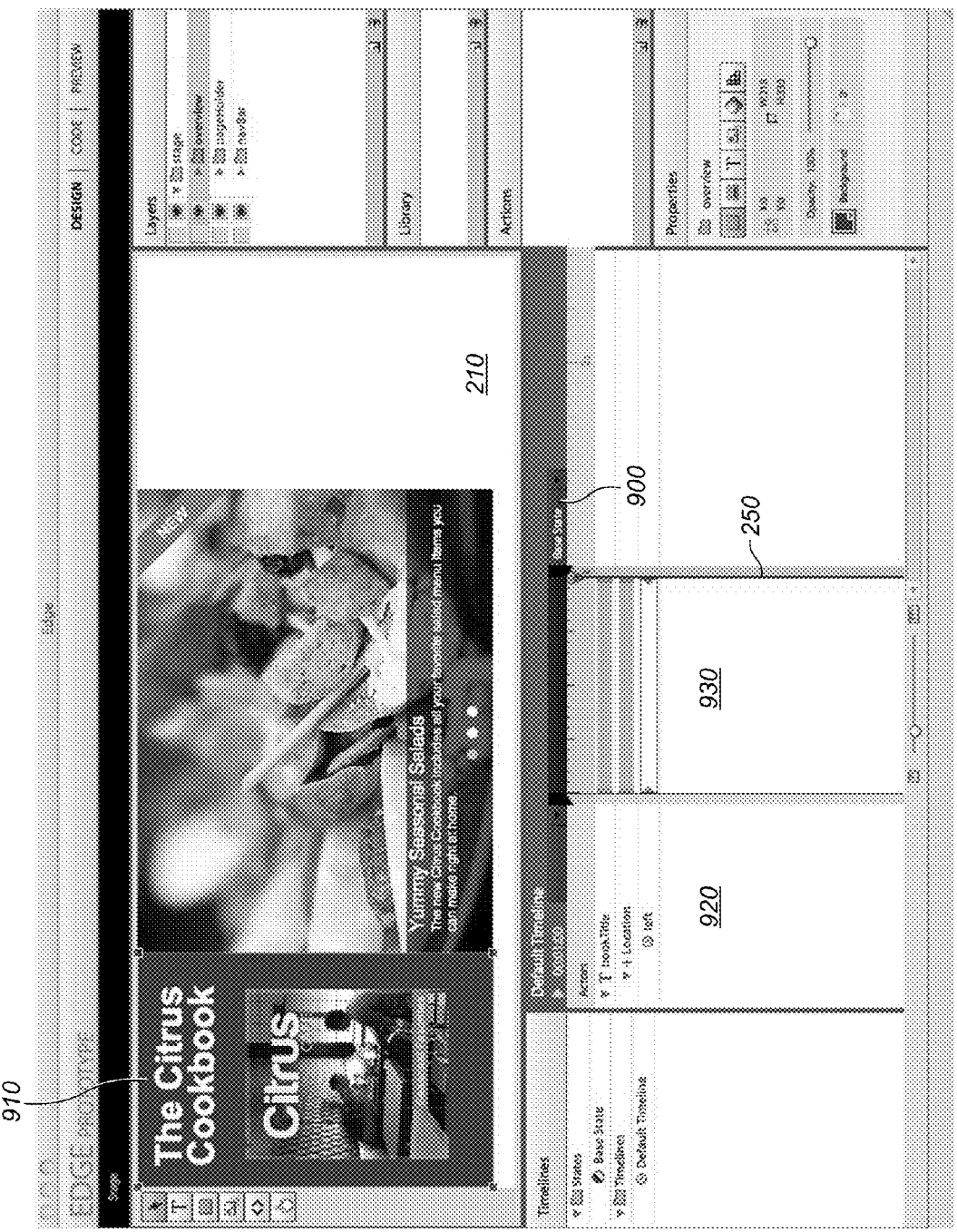
FIGS. 9 and 10 are screenshots of an animation example according to some embodiments.
Figure 10:
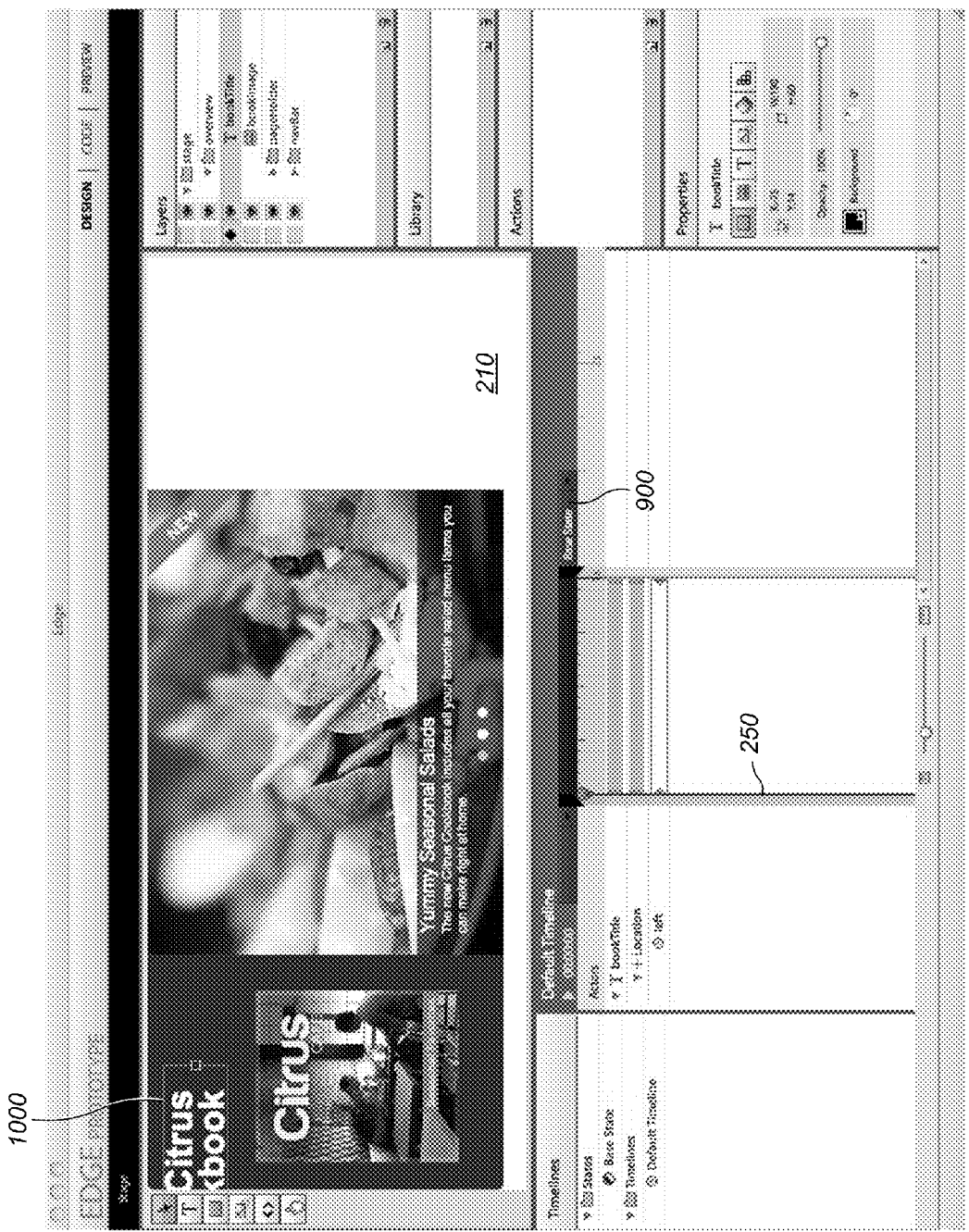

By way of another example, the screenshots shown in FIGS. 9 and 10 depict methods for controlling the structure of animated documents according to some embodiments. As illustrated in FIG. 9, a particular animation may have an initial or original base state indicated by the base state indicator 900, and a user may select a portion of animation 910 to be edited on stage 210. In response to the user's selection, animation engine 120 may identify elements 920 and their respective timelines 930 within UI 200. In this case, playhead 250 coincides with base state indicator 900 along the timelines; therefore the user's editing is understood to modify the static structure of the underlying document. Meanwhile, in FIG. 10, element 1000 has been moved to a different position. Further, in contrast with FIG. 9, here playhead 250 has been moved no another point in the timeline that does not coincide with base state indicator 900. As such, the user's editing of element 1000 is understood to modify the programmatic elements or components of the underlying document, thus affecting only the animation and not the static structure of the document.

Figure 13:
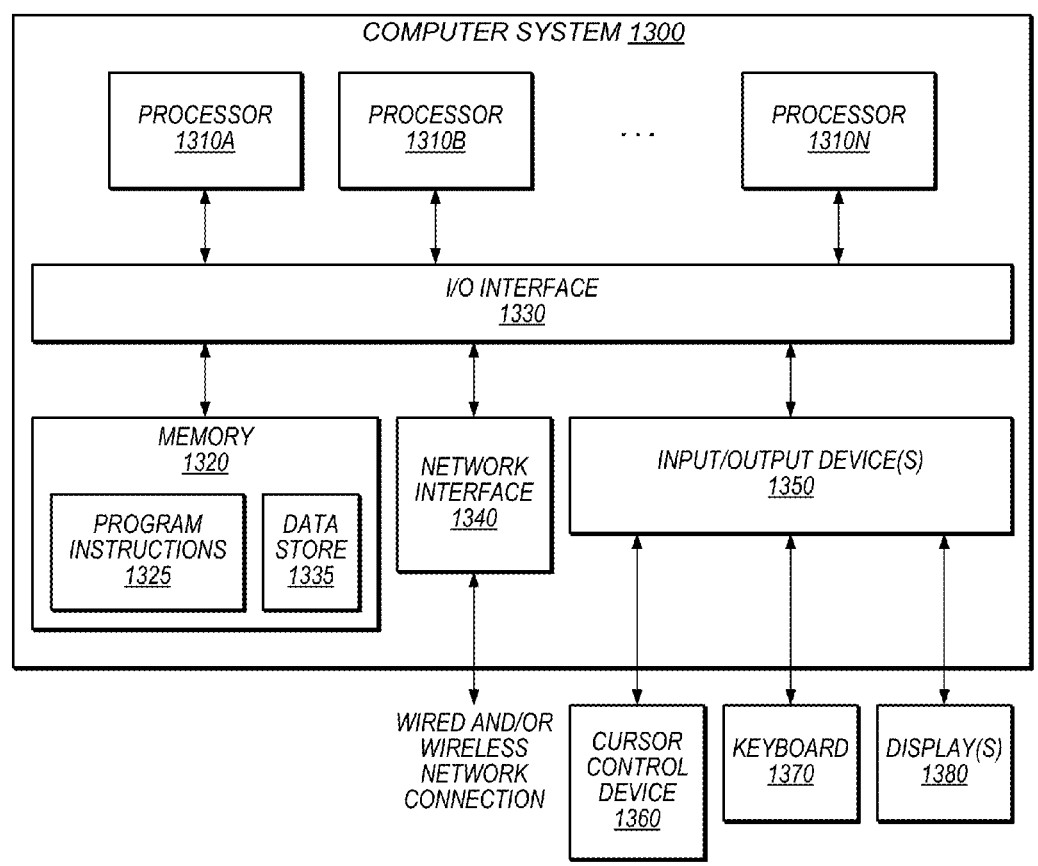
FIG. 13 is a block diagram of a computer system configured to implement systems and methods disclosed herein according to some embodiments.

To further illustrate the foregoing, FIGS. 12 and 13 show software code part of the animation examples of FIGS. 9 and 10 according to some embodiments. Specifically, FIG. 11 shows structural portion 1100 of a document altered (e.g., "background-color") in response to the edits shown in FIG. 9; thus modifying the documents base state. Meanwhile, FIG. 12 shows a programmatic component of the document (e.g., a "tween" command) altered in response to the edits shown in FIG. 10; thus altering only the animation without modifying the document's base state.

A Computer System

Embodiments of a system and method for controlling the structure of animated documents, as described herein, may be executed on one or more computer systems, which may interact with various other devices. One such computer system is illustrated by FIG. 13. In different embodiments, computer system 1300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x136, PowerPC®, ARM®, SPARC®, or MIPS® ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods and techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA® Corporation, ATI® Technologies (AMD®), and others.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an animation module (such as animation module 120) are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media—e.g., disk or CD/DVD-ROM coupled to computer system 1300 via I/O interface 1330. Program instructions and data stored on a non-transitory computer-accessible medium may further be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 (e.g., "user input 112" in FIG. 1) may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1325, configured to implement certain embodiments described herein, and data storage 1335, comprising various data accessible by program instructions 1325. In an embodiment, program instructions 1325 may include software elements of embodiments illustrated in the above figures. For example, program instructions 1325 may be implemented in various embodiments using any desired programming language, scripting language, or combination of programming languages and/or scripting languages, e.g., C, C++, C#, Java™, JavaScript™, Perl, etc. Data storage 1335 may include data that may be used in these embodiments. In other embodiments, other or different software elements and data may be included.

A person of ordinary skill in the art will appreciate that computer system 1300 is merely illustrative and is not intended to limit the scope of the disclosure described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

A person of ordinary skill in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the invention embrace all such modifications and changes and, accordingly, the above description to be regarded in an illustrative rather than a restrictive sense.

The invention claimed is:

1. A system, comprising:
   at least one processor; and
   a memory coupled to the at least one processor and storing program instructions-executable by the at least one processor to perform operations including:
      displaying, via a graphical user interface, a representation of a document including an animation that is renderable by executing programmatic elements of the document to manipulate a structure of the document;
      displaying the document in a natural state that corresponds to an initial point of the animation and represents a version of the document that a search engine configured to analyze only static structural elements of a document encounters during a search;
      rendering the animation starting from the initial point of the animation by executing programmatic elements of the document;
      responsive to receiving a selection of a point of the animation that occurs in between the initial point of the animation and an end point of the animation, designating the selected point of the animation as a new base state of the document;
      altering the version of the document that the search engine encounters during a search to correspond to the new base state without changing the natural state of the document such that any subsequent rendering of the animation still starts from the initial point of the animation that corresponds to the natural state; and
      maintaining the natural state of the document and the new base state so that any subsequent rendering of the animation starts from the initial point of the animation while the version of the document that the search engine encounters during a search corresponds to the selected point of the animation that occurs in between the initial point of the animation and the end point of the animation.

2. The system of claim 1, wherein the document includes a HyperText Markup Language (HTML) document, and wherein the operations further include, responsive to said altering, recalculating a scripting language command for the document such that upon loading of the document by a web browser, the document is rendered based on the natural state.

3. The system of claim 1, wherein the structure of the document includes at least one of a text, a font size, a font type, a position, or a color.

4. The system of claim 1, wherein the selection of the point of the animation that occurs in between the initial point of the animation and the end point of the animation is received via at least one of a timeline, a storyboard, a flowchart, or an event list.

5. The system of claim 1, wherein the new base state corresponds to a point in time during presentation of an animation effect within the animation.

6. The system of claim 1, wherein the program instructions are further executable by the at least one processor to perform operations including:
   responsive to detecting editing of a portion of the animation corresponding to the new base state, providing a visual cue via the graphical user interface that the editing affects a static structure of the document; and
   responsive to detecting editing of another portion of the animation not corresponding to the new base state, providing a visual cue via the graphical user interface that the editing affects the animation.

7. A method, comprising:
   performing, by one or more computing devices:
      receiving a request to create a document including an animation that is renderable from an initial point of the animation to an end point of the animation by executing programmatic elements of the document to manipulate a structure of the document;
      enabling selection of one of a plurality of base states of the document each of the plurality of base states of the document occurring after the initial point of the animation and before the end point of the animation;
      receiving a selection of one of the plurality of base states;
      defining, based on the selected base state, a searchable version of the document such that a search engine configured to analyze only static structural elements of a document encounters the searchable version of the document during a search, without changing a natural state of the document such that any subsequent rendering of the animation still starts from the initial point of the animation that corresponds to the natural state; and maintaining the natural state of the document and the selected base state so that any subsequent rendering of the animation starts from the natural state while the searchable version of the document that the search engine encounters during a search corresponds to the selected base state.

8. The method of claim 7, wherein the document includes a HyperText Markup Language (HTML) document, and wherein the operations further include, responsive to receiving the selection, recalculating a scripting language command for the document so that upon loading of the document by a web browser, the document is rendered based on the natural state.

9. The method of claim 7, wherein the structure of the document includes at least one of a text, a font size, a font type, a position, or a color.

10. The method of claim 7, wherein enabling selection of the one of the plurality of possible base states to define the searchable version of the document comprises enabling selection via at least one of a timeline, a storyboard, a flowchart, or an event list.

11. The method of claim 7, further comprising:
detecting, by the one or more computing devices, one or more edits to the document; and
responsive to detecting that the one or more edits affect one or more of the plurality of possible base states of the document, providing a visual cue via a graphical user interface that the one or more edits affects a static structure of the document.

12. The method of claim 7, further comprising:
detecting, by the one or more computing devices, one or more edits to the document; and
responsive to detecting that the one or more edits do not affect one or more of the plurality of possible base states, providing a visual cue via the graphical user interface that the one or more edits affects the animation.

13. A non-transitory computer-readable storage media having program instructions stored thereon that are executable by a computer system to cause the computer system to perform operations including:
displaying a document including an animation that is renderable from an initial point of the animation to an end point of the animation by executing programmatic elements of the document to manipulate a structure of the document;
identifying a natural state of the document that corresponds to the initial point of the animation and represents a version of the document that a search engine configured to analyze only static structural elements of a document encounters during a search;
rendering the animation starting from the initial point by executing programmatic elements of the document;
receiving a selection of a point of the animation that occurs in between the initial point of the animation and the end point of the animation;
responsive to receiving the selection, designating the selected point of the animation as a new base state and modifying the version of the document that the search engine encounters during a search to correspond to the new base state; and
maintaining the natural state of the document and the new base state so that any subsequent rendering of the animation starts from the natural state and the version of the document that the search engine encounters during a search corresponds to the selected point of the animation that occurs in between the initial point of the animation and the end point of the animation.

14. The non-transitory computer-readable storage media of claim 13, wherein the document includes a HyperText Markup Language (HTML) document, and wherein the operations further include, responsive receiving the selection, recalculating a scripting language command for the document such that upon loading of the document by a web browser, the document is rendered based on the new base state.

15. The non-transitory computer-readable storage media of claim 13, wherein the selection of the point of animation that occurs in between the initial point of the animation and the end point of the animation is received via at least one of a timeline, a storyboard, a flowchart, or an event list.

16. The non-transitory computer-readable storage media of claim 13, wherein the new base state corresponds to a point in time during the animation when an animation effect is complete.

17. The non-transitory computer-readable storage media of claim 13, wherein the program instructions, upon execution by the computer system, further cause the computer system to provide an indication that an animation editing command affects the animation in response to detecting that the animation editing command does not modify the new base state.

18. The system of claim 1, wherein the programmatic elements comprise JavaScript scripting language.

19. The method of claim 7, wherein the programmatic elements comprise JavaScript scripting language.

20. The non-transitory computer-readable storage media of claim 13, wherein the programmatic elements comprise JavaScript scripting language.

* * * * *

UNITED STATES PATENT AND TRADEMARK OFFICE
CERTIFICATE OF CORRECTION

PATENT NO. : 9,773,336 B2  
APPLICATION NO. : 13/153114  
DATED : September 26, 2017  
INVENTOR(S) : Anders et al.

It is certified that error appears in the above-identified patent and that said Letters Patent is hereby corrected as shown below:

In the Claims

Column 16, Line 6, Claim 1 after "document" insert -- , --, therefor.

Column 16, Line 54, Claim 7 after "document" insert -- , --, therefor.

Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*